Figure 1:
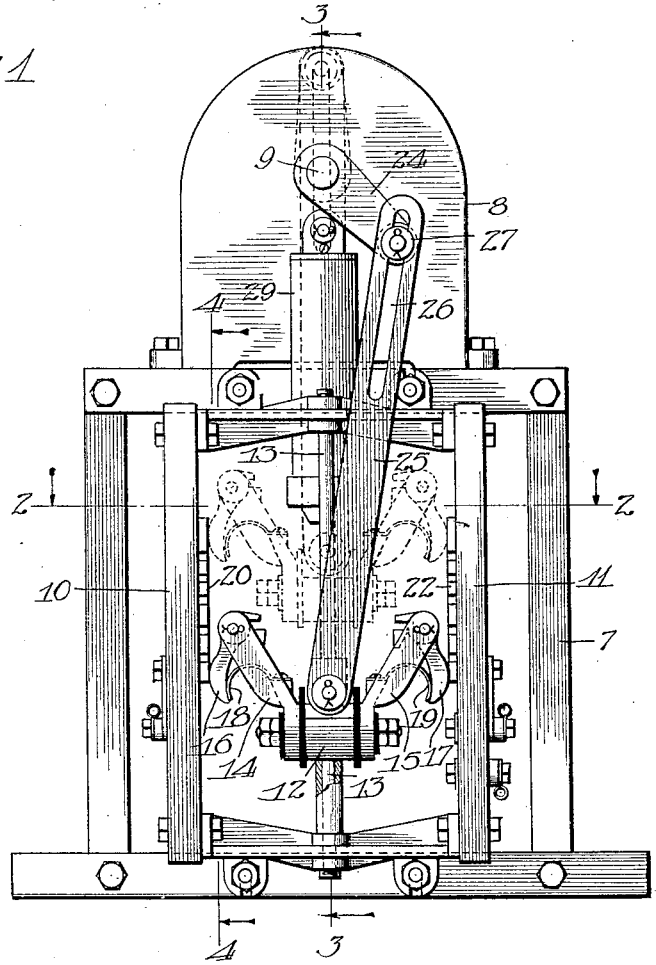

W. E. DATE.
ALTERNATING CURRENT MOTOR CONTROLLER.
APPLICATION FILED NOV. 2, 1908.

1,120,376.

Patented Dec. 8, 1914.
3 SHEETS—SHEET 1.

Witnesses
Robert H. Weir
Frank H. Hubbard

Inventor
William E. Date
By his Attorney
Edwin B. H. Tower, Jr.

W. E. DATE.
ALTERNATING CURRENT MOTOR CONTROLLER.
APPLICATION FILED NOV. 2, 1908.

1,120,376.

Patented Dec. 8, 1914.
3 SHEETS—SHEET 2.

Witnesses
Robert H. Weir
Frank H. Hubbard

Inventor:
William E. Date
By his Attorney
Edwin B. H. Tower, Jr.

THE NORRIS PETERS CO., PHOTO-LITHO., WASHINGTON, D. C.

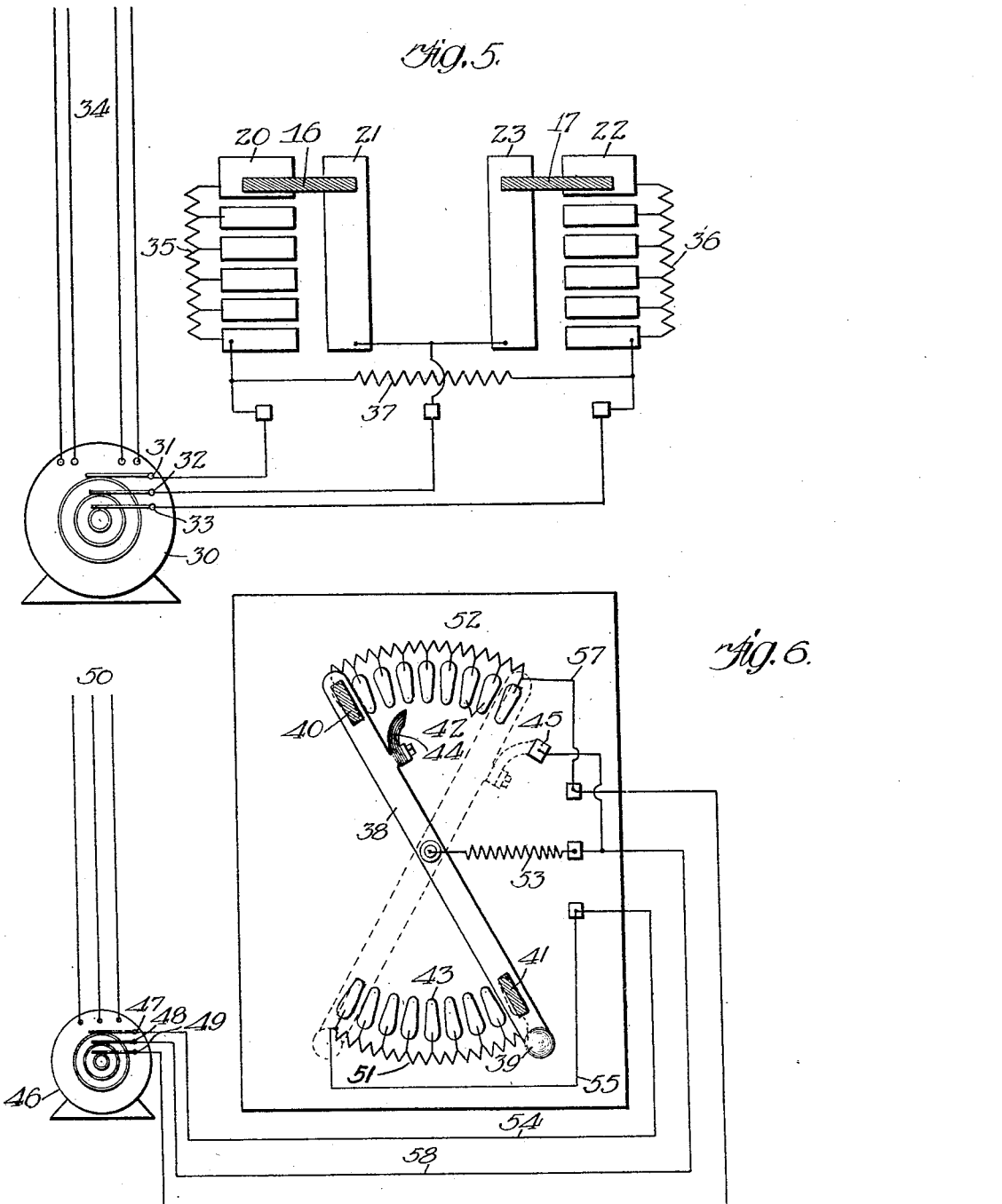

UNITED STATES PATENT OFFICE.

WILLIAM E. DATE, OF WESTFIELD, NEW JERSEY, ASSIGNOR TO THE CUTLER-HAMMER MFG. CO., OF MILWAUKEE, WISCONSIN, A CORPORATION OF WISCONSIN.

ALTERNATING-CURRENT-MOTOR CONTROLLER.

1,120,376.      Specification of Letters Patent.      Patented Dec. 8, 1914.

Application filed November 2, 1903. Serial No. 460,677.

*To all whom it may concern:*

Be it known that I, WILLIAM E. DATE, a citizen of the United States, residing at Westfield, in the county of Union and State of New Jersey, have invented new and useful Improvements in Alternating-Current-Motor Controllers, of which the following is a full, clear, concise, and exact description, reference being had to the accompanying drawing, forming a part of this specification.

My invention relates to improvements in alternating current motor starters.

In order to secure the maximum torque for a given current in an induction motor, the current in the three phases of the secondary winding must be approximately equal. If starting resistance is placed in only two phases of the secondary winding, the currents in the three phases of said winding will be unequal, and accordingly the torque will be low and the motor will be unable to start under load, if the load be above a certain amount. It has been found preferable in practice to build induction motor controllers in which there are only two sections of variable starting resistance, one for each of two phases of the secondary winding. The third phase of the secondary winding is without starting resistance, and accordingly the currents in the three phases of said winding are unequal when the motor circuit is first closed.

The object of my invention is to provide means whereby the resistance in the three phases of the secondary winding will be balanced when the motor circuit is first closed, so as to provide means whereby resistance will be placed in the three phases of the secondary winding when the motor circuit is first closed.

In accordance with my invention I use, in addition to the two sections of variable resistance, a third resistance so that I provide a section of resistance for each of the three phases of the secondary winding. These resistances are so proportioned that the current in the three phases of the secondary winding will be sufficient to start the motor under a given load with said resistance in circuit. I provide my controller with means for removing the third section of resistance from circuit when the other two sections are removed from circuit. I preferably short-circuit the third section of resistances after the other two sections have been removed from circuit. In practice I have worked out two controllers which embody my invention. I shall describe these controllers in order to more fully explain the characteristic features of my invention. It will be understood, however, that my invention is susceptible of being embodied in various other forms, and that the circuit relations and electrical proportions of elements may be modified to suit the conditions under which the controller is to be used.

Figure 2:
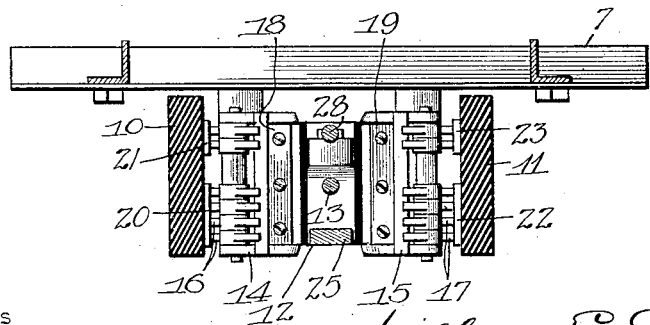
Figure 3:
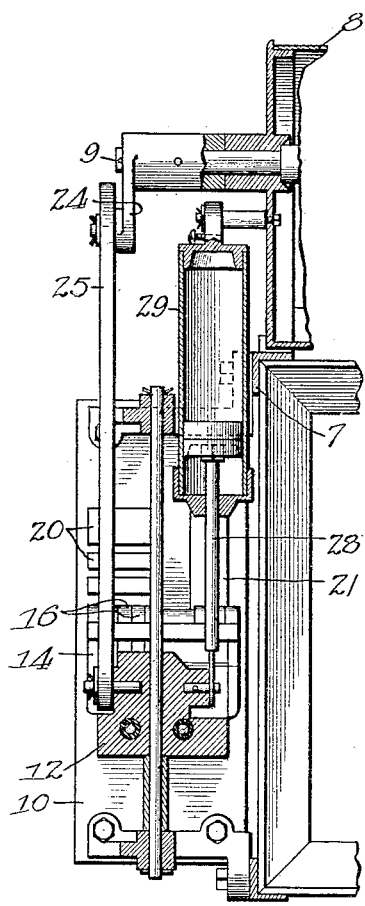
Figure 4:
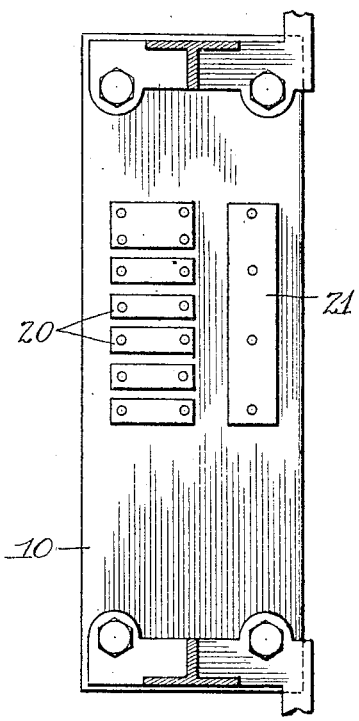

The views in said drawings are as follows:

Figure 1 is a front elevation of a controller in which the resistance varying member moves automatically. Fig. 2 is a sectional view on the line 2—2 of Fig. 1. Fig. 3 is a sectional view taken generally on the line 3—3 of Fig. 1. Fig. 4 is a vertical sectional view, taken on the line 4—4 of Fig. 1. Fig. 5 is a diagram of the controller circuits, as applied to a two-phase alternating current motor. Fig. 6 is a diagrammatic view of another form of controller, and its circuits, as applied to a motor, the resistance varying element of the controller being manually operated.

I shall first describe the controller which is illustrated in Figs. 1 to 5. This controller is provided with a supporting frame 7 on the top of which is mounted a plate 8, which forms a bearing for a shaft 9. In practice this shaft may carry the contacts of a reversing switch. On the front of the supporting frame 7 are two parallel plates, or bases, 10 and 11, between which is arranged a vertically movable contact carrier 12, which is slidably mounted upon a vertical rod 13. On the opposite sides of the brush carrier are mounted brackets 14 and 15, which are insulated therefrom. These brackets carry pivoted fingers 16 and 17, which are pressed outwardly by springs 18 and 19. On the base 10 are mounted a series of vertically arranged contacts 20, and a continuous vertical contact plate 21, and on the base 11 are mounted a similar series of vertically arranged contacts 22 and a continuous vertical contact 23. The contact fingers 16 move over the contacts 20 and the plate 21, and the contact fingers 17 move over the contacts 22 and the contact plate 23. The brush carrier 12 is connected to a crank 24 on the shaft 9 by means of a link 25. This link is pivoted to the contact carrier 12 and is provided with an elongated slot 26 at its upper end. The crank 24 is provided with a crank pin 27 that protrudes through the slot. The crank 24 initially stands in an upper vertical position, as indicated in dotted lines. The brush carrier is then raised to its upper position, as indicated in dotted lines. If it be desired to start the motor, the shaft 9 is turned so as to lower the crank in the position in which it is shown in full lines. The crank pin 27 will pass down the slot 26 and accordingly the link will be released from the crank, thereby leaving the brush carrier 13 free to descend. The shaft 9 may carry suitable contacts for closing the motor circuit when said shaft is turned to operate the controller to start the motor. The brush carrier is connected to the piston rod 28 of a dash-pot 29, which is pivotally mounted upon the frame 8. This dash-pot retards the downward movement of the contact carrier.

I shall now refer to the diagram of the circuits illustrated in Fig. 5. The induction motor 30 is provided with three brushes, 31, 32 and 33, which engage slip rings connected to the secondary winding. The primary winding of the motor is connected to an alternating current circuit 34, which may be a two-phase circuit as illustrated. This circuit may be controlled by any suitable switch, as, for instance, switch contacts mounted on the shaft 9. The controller is provided with a variable resistance 35, a variable resistance 36 and a constant resistance 37. The variable resistance 35 is connected to the contacts 20 and the brush 31. The variable resistance 36 is connected to the contacts 22 and the brush 33, and the constant resistance 37 is connected between the brush 31 and the brush 33 to the contact plates 21 and 23, which are electrically connected to each other and to the brush 32. The contact fingers 16 electrically connect the contacts 20 and the contact plate 21, and the fingers 17 electrically connect the contacts 22 and the contact plate 23. It will thus be seen that the circuit of the secondary winding is divided into three phases, one of which extends from the brush 31, through variable resistance 35, contacts 20, fingers 16, contact plate 21 to the brush 32. Another from the brush 33, through variable resistance 36, contacts 22, contact fingers 17, contact plate 23 to the brush 32, and a third from a brush 31, through resistance 37 to the brush 33. Accordingly in each of these phases there is a section of starting resistance. These sections of resistance may be equal so that the current in each of the three phases of the secondary winding will be equal, thereby causing the motor to develop its maximum torque for a given current at the instant of starting. Of course, it is only necessary that the resistances be so proportioned that the torque, which is developed by the motor, will be sufficient to start the motor under the load that is imposed thereon. As the contact fingers 16 and 17 pass downwardly over the contacts 20 and 22, the variable resistances 35 and 36 are gradually removed from circuit. When these fingers reach the bottom the variable resistances 35 and 36 are entirely removed from circuit and the resistance 37 is completely short-circuited.

Fig. 6 illustrates another form of motor controller embodying my invention. In this controller there is a centrally pivoted contact arm 38 on which there is an operating handle 39. This arm carries two brushes 40, 41, one at each end, which brushes sweep over contacts 42 and 43 respectively. The contact arm 38 carries a brush 44 which engages a stationary contact 45 when said arm stands in the position indicated in dotted lines. The motor 46 has three brushes, 47, 48 and 49, which engage slip rings connected to the secondary winding. The primary winding of the motor may be connected to an alternating current circuit, which may be a three-phase circuit 50. A variable resistance 51 is connected to the contacts 43, and also to the brush 47. A second variable resistance 52 is connected to the contacts 42, and also to the brush 49, and a constant resistance 53 is connected to the contact arm and also to the brush 48. As illustrated in the drawing, the contact arm is arranged to maintain the secondary circuit closed at all times. This arrangement has been found more satisfactory in practice, but of course the contact arm may be arranged to open the secondary circuit if desired. When the motor is started one phase of the secondary circuit extends from the brush 47 through conductor 54, conductor 55, to resistance 51. Another phase extends from brush 49, through conductors 56 and 57 to variable resistance 52; and still another from brush 48, through conductor 58 to resistance 53. These resistances are all connected to the contact arm. It will thus be seen that a resistance is arranged between each of the three phases of the secondary circuit. These resistances are so proportioned that the currents in the three phases are of such relative value that the torque developed with the starting resistance in circuit is sufficient to start the motor under its load. As the brushes 40 and 41 pass over the contacts 42 and 43, respectively, the variable resistances 51 and 52 are removed from circuit step by step.

When the contact arm reaches its final position, as indicated in dotted lines, the variable resistances 51 and 52 are entirely removed from circuit, and the resistance 53 is short-circuited by the brush 44 and contact 45.

While I have described herein certain electrical connections which exist in the two devices that I have worked out in practice, it will be understood that my invention is susceptible of being applied to alternating current motor starters in various ways without eliminating the features which the appended claims define.

What I claim as new and desire to secure by Letters Patent is:—

1. In an induction motor starter, in combination, a plurality of resistances, one for each phase of the secondary circuit of the motor, certain of said resistances being variable and another constant, and a single movable contact member for completely removing all of said resistances from circuit through connections all made to stationary points, said movable member being adapted to remove said variable resistances from circuit gradually, and to short-circuit said constant resistance at a predetermined point in its movement.

2. In an induction motor starter, in combination, a plurality of resistances, one for each phase of the secondary circuit of the motor, certain of said resistances being variable and another constant, and a single movable contact member for completely removing all of said resistances from circuit through connections all made to stationary points, said movable member being adapted to remove said variable resistances from circuit gradually and simultaneously, and to short-circuit said constant resistance after completely removing the variable resistances from circuit.

3. In an induction motor starter, in combination, two series of contacts, variable resistances connected to said series of contacts and connected in different phases of the secondary circuit of the motor, a constant resistance for a third phase of the secondary circuit of the motor, and a sliding contact member arranged between said series of contacts and movable over the same for removing said variable resistances from circuit gradually and simultaneously, said movable contact member being adapted to short-circuit said constant resistance after completely removing said variable resistances from circuit, all circuit connections between said contact member, said resistances and the slip rings of the motor being made to stationary parts.

4. In an induction motor starter, in combination, two series of contacts, variable resistances connected to said series of contacts and connected in different phases of the secondary circuit of the motor, a constant resistance for a third phase of the secondary circuit of the motor connected between the last of said series of contacts, and a sliding contact member movable over said series of contacts for gradually removing said variable resistances from circuit and short-circuiting said constant resistance, said contact member being arranged to completely remove all of said resistances from circuit, all connections through said sliding contact member being made through stationary contacts.

5. In a controller for induction motors, in combination, two sets of contacts, a movable controlling member having contacts mounted thereon and arranged to engage and move over said sets of contacts, a plurality of resistances connected to said sets of contacts, said resistances being connected in different phases of the secondary circuit of the motor, said controlling member, when operated, being adapted to gradually remove two of said resistances from circuit and to short-circuit a third resistance upon completely removing the other resistances from circuit, and a contact arranged to be continuously engaged by each of the contacts of said controlling member to electrically connect the same to a common slip ring of the motor.

6. In a controller for induction motors, in combination, two parallel insulating bases, a set of contacts carried by each of said insulating bases, a controlling member arranged between said insulating bases and having contacts thereon for engaging said series of contacts, two variable resistances, and a constant resistance connected to said series of contacts, said resistances being connected in different phases of the secondary circuit of the motor and said controlling member being movable over said contacts to gradually remove said variable resistances from circuit and to short-circuit said constant resistance upon completely removing said variable resistance from circuit, and contacts on said bases to be continuously engaged by said controlling member to directly connect the same with one of the slip rings of the motor.

7. In a controller for induction motors, in combination, two insulating supporting bases, a series of contacts mounted on each of said bases, a variable resistance connected to each of said series of contacts, said series of contacts being electrically connected to different slip rings of the motor, a constant resistance connecting said series of contacts, a controlling member having contacts engaging said series of contacts, and elongated contacts mounted on each of said bases arranged to be continuously engaged by the contacts of said controlling member, said elongated contacts being connected to a third slip ring of the motor, said controlling member, when operated, being adapted to gradually remove said variable resistances from circuit and to short-circuit said constant resistance upon completely removing said variable resistances from circuit.

In witness whereof, I have hereunto subscribed my name in the presence of two witnesses.

WILLIAM E. DATE.

Witnesses:
F. C. JOUTRAS,
R. E. LUDWICK.

Copies of this patent may be obtained for five cents each, by addressing the "Commissioner of Patents, Washington, D. C."